United States Patent [19]

Nakamura

[11] Patent Number: 4,690,878
[45] Date of Patent: Sep. 1, 1987

[54] BATTERY POWER DETECTOR FOR SENSING PRESENCE OF BATTERIES

[75] Inventor: Ikushi Nakamura, Sakai, Japan

[73] Assignee: Minolta Camera Kabukishi Kaisha, Japan

[21] Appl. No.: 897,101

[22] Filed: Aug. 15, 1986

[30] Foreign Application Priority Data

Aug. 23, 1985 [JP] Japan .......................... 60-129357[U]
Feb. 12, 1986 [JP] Japan ................................ 61-29400

[51] Int. Cl.⁴ .......................................... H01M 2/10
[52] U.S. Cl. ........................................ 429/1; 429/97; 429/99
[58] Field of Search ...................... 429/96, 97, 99, 98, 429/100, 1

[56] References Cited

U.S. PATENT DOCUMENTS 4,008,356  2/1977  Asano ................................... 429/98
4,371,594  2/1983  Ohara et al. ........................... 429/97

*Primary Examiner*—Donald L. Walton
*Attorney, Agent, or Firm*—Watson Cole et al.

[57] ABSTRACT

This invention is directed to a power supplier for use, for example, in a portable camera which includes a battery housing for accommodating a set of cylindrical batteries in parallel relationship with each other, and a battery door which is connected to the battery housing by means of a hinge so as to open an opening of the housing and to close the opening so as to axially depress the batteries. The batteries are located in the battery housing at two positions, i.e. one position relatively close to the hinge and the other position relatively remote from the hinge. The power supplier further includes a detector which is mounted on the bottom of the battery housing so as to operate when at least one battery located at the position remote from the hinge is depressed due to the battery closing operation and the batteries are connected to each other in series, and a switch which is mounted on the bottom of the battery housing so as to operate due to the operation of the detector to generate a signal indicating that the batteries have been connected to each other in series.

3 Claims, 14 Drawing Figures

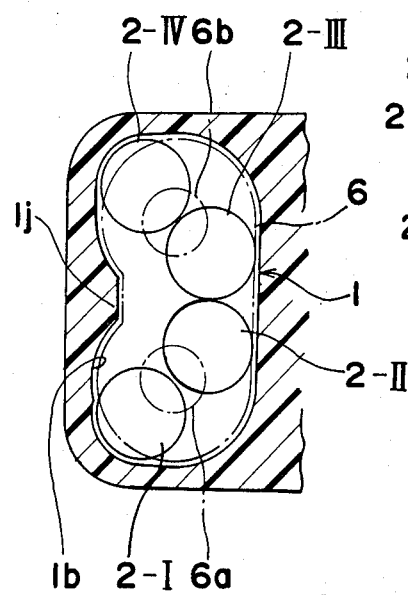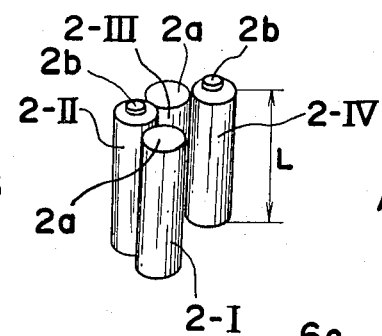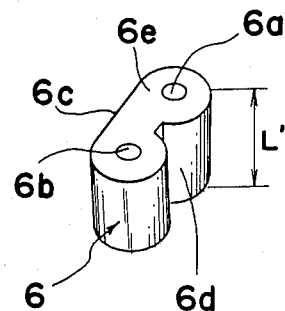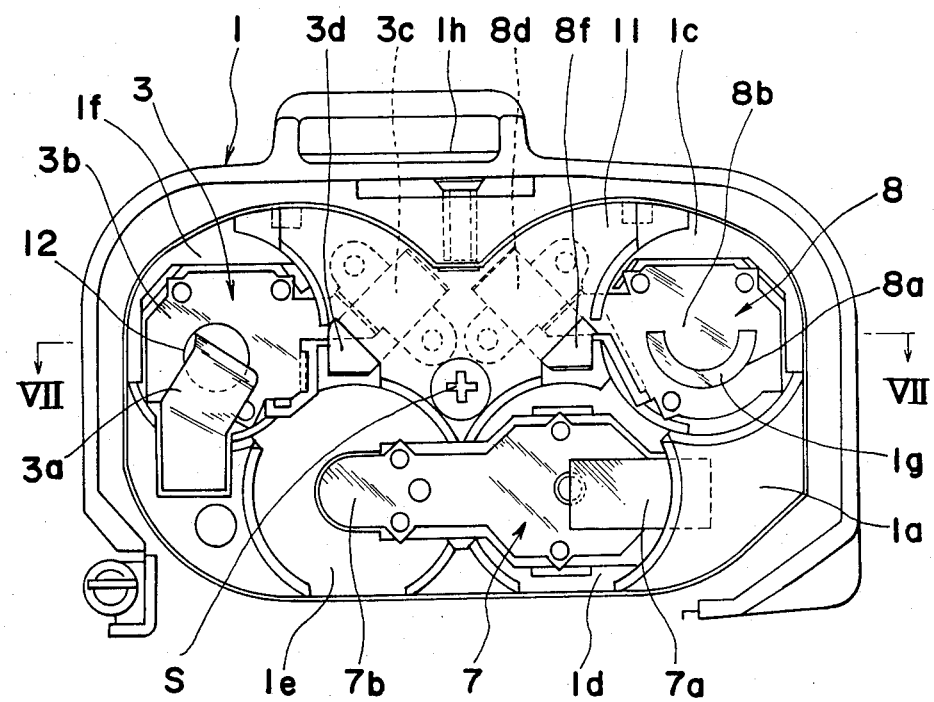

BATTERY POWER DETECTOR FOR SENSING PRESENCE OF BATTERIES

BACKGROUND OF THE INVENTION

1. Field of the Invention

The present invention generally relates to a power supply for use in a portable electronic apparatus, such as a camera, to which small size dry batteries are employed, and more particularly to a power supply which has a battery housing for accommodating dry batteries therein, a battery door for exposing and closing an opening of the housing and a detector for detecting, when the door is closed, such a condition as to whether or not the batteries are accommodated in the housing.

2. Description of the Related Art

The portable electronic apparatus such as a camera generally has a power supply. For instance, a known power supply for a portable camera has a battery housing for accommodating a plurality of small size cylindrically dry batteries, for example four batteries, therein, and a hinged battery door which is so connected to an edge of the opening of the housing as to expose and close the opening. For example, in a camera, the batteries are generally arranged in the housing parallel to each other and in two lines. Namely, a pair of inner adjacent batteries are arranged at positions close to the hinge of the door, while the other pair of outer batteries are arranged at the different positions remote from the hinge. Such arrangement of the batteries is similar to an arrangement shown in FIG. 3 which illustrates an embodiment of the present invention.

It is to be noted here that a specific type of camera has a voltage metering device for the batteries accommodated in the battery housing. According to the device, it can be detected whether or not new batteries generate the predetermined voltage. Furthermore, some cameras are provided with a microcomputer for controlling various operations, such as film frame counting, and a back-up battery for temporarily holding the predetermined data stored in the microcomputer, such as the number of film frames which has been taken, while the main batteries, i.e. the batteries in the power supply, are removed from the battery housing for the purpose of replacement. In these cases, the camera should be provided with a detector for detecting such a condition that a new set of batteries is inserted in the battery housing. When a new set of batteries is inserted in the battery housing, the detector will generate a start signal for starting the operation of the voltage metering device and reading out the data from a memory circuit such as a RAM to a CPU in the microcomputer.

Meanwhile, in the case where a plurality of cylindrically-shaped batteries, for example four cylindrical batteries, are accommodated in the battery housing, it is quite important that the detector be operated after or at the time when all of the batteries to be inserted are completely connected to each other in series. If the detector is operated when, for instance, only one or two batteries are inserted in the battery housing, the voltage metering device may indicate an incorrect voltage value, and some troubles will be caused in reading out the data.

SUMMARY OF THE INVENTION

An object of the present invention is to provide a power supply which has a detector, for detecting whether or not the batteries have been connected to each other in series in the battery housing, which is operated after or at the time when all of the batteries to be inserted are completely connected to each other in series.

In accomplishing this and other objects, with an electronic apparatus according to the present invention, there is provided a power supply which comprises a battery housing for accommodating a set of cylindrically batteries in parallel relationship with each other; a battery door which is connected to the battery housing by means of a hinge so as to expose an opening of the housing and to close the opening so as to axially depress the batteries; a first contact means which is mounted on a bottom of the battery housing so as to be in contact with terminals of the batteries; a second contact means which is mounted on the battery door so as to be in contact with terminals of the batteries and to connect the batteries in series in association with the first contact means. The batteries being located in the battery housing at two positions, i.e. one position relatively close to the hinge and the other position relatively remote from the hinge. A detector is mounted on the bottom of the battery housing so as to operate when at least one battery located at the position remote from the hinge is depressed due to the battery door closing operation. The batteries are connected to each other in series, and a switch is mounted on the bottom of the battery housing so as to operate due to the operation of the detector for signalling that the batteries have been connected to each other in series.

With the power supply as described above, when the battery door is closed after a set of batteries is inserted in the battery housing, the door depresses the batteries so that the contact means mounted on the door and the bottom of the housing come into contact with the corresponding terminals of the batteries. The detector operates when the battery, which is located at the position remote from the hinge, is depressed by means of the door. That is to say, the detector operates after all of the batteries have been connected to each other in series. The switch is operated by the operation of the detector and signals the apparatus, such as a camera, that the batteries have been connected to each other in series. The voltage metering device arranged in the apparatus starts its operation when it receives the information from the switch. Accordingly, the device can correctly detect the voltage of the batteries. Furthermore, the data stored in a memory circuit such as RAM can be correctly read out into a CPU.

BRIEF DESCRIPTION OF THE DRAWING

The above objects and features of the present invention will become apparent from the following description taken in conjunction with the preferred embodiment thereof, with reference to the accompanying drawing, in which:

FIG. 3 is a cross section of the power supply shown in FIG. 2;

FIG. 4 is a perspective view showing a set of cylindrically-shaped batteries which are to be inserted in the power supply shown in FIG. 2;

FIG. 5 is a perspective view showing a single packed lithium battery;

FIG. 6 is a bottom plan view of the power supply shown in FIG. 2;

DETAILED DESCRIPTION OF THE INVENTION

Figure 1A:
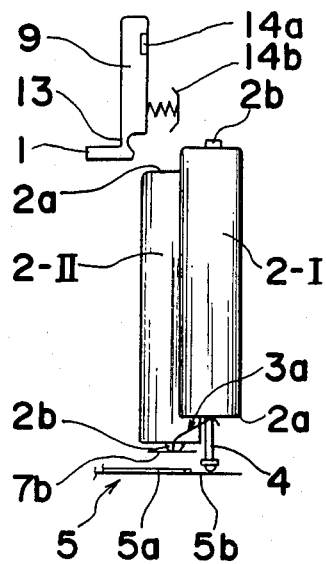
FIGS. 1a, 1b and 1c are, respectively, explanatory views showing a principle operation of a power supply according to a preferred embodiment of the present invention.

Before the description of the present invention proceeds, it is to be noted that like parts are designated by like reference numerals and symbols throughout several views of the accompanying drawings.

Figure 1B:
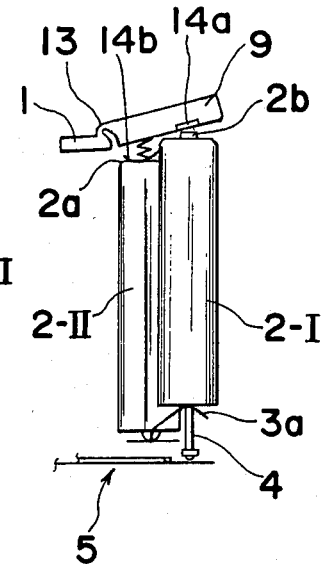
Figure 1C:
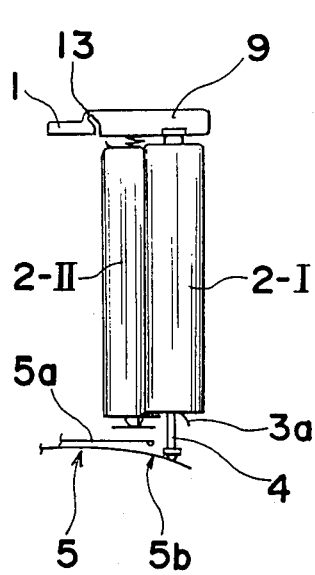

Referring to FIGS. 1a, 1b and 1c, there is shown, in a simplified manner, a power supply according to one preferred embodiment of the present invention. The power supply comprises a battery housing 1 for accommodating a plurality of cylindrically-shaped dry batteries 2-I, 2-II, etc, and a battery door 9 which is connected to the housing 1 by means of a hinge 13. The batteries can be divided in two groups. One group of batteries 2-I are located remote from the hinge 13, while the other group of batteries 2-II are located close to the hinge 13. The door 9 has a corresponding number of contact members or contact portions 14a and 14b which can contact the corresponding terminals of the batteries. Moreover, the housing 1 has, at its bottom, a corresponding number of contact members or contact portions 3a and 7b. An insulation pin 4 is mounted on the bottom of the housing 1 so as to face the negative terminal of the battery 2-I. A switch 5 is mounted on the bottom of the housing 1 so as to operate in association with the pin 4.

With the construction of the power supply, as shown in FIGS. 1a, 1b and 1c, when the door 9 is opened, as shown in FIG. 1a, and the predetermined number of batteries are arranged in the housing 1, the batteries are not yet connected to each other and the switch 5 is closed. Namely, the fixed contact plate 5a and the movable contact plate 5b of the switch 5 are connected to each other. When the door 9 is closed, but not yet completely closed, as shown in FIG. 1b, the contact portion 14b can be in contact with the negative terminal of the battery 2-II, which belongs to a group close to the hinge 13, while the other contact portion 14a may not yet completely be in contact with the corresponding positive terminal 2b of the battery 2-I, which belongs to the other group remote from the hinge 13. Subsequently, the door 9 is closed completely, as shown in FIG. 1c, the contact portion 14a can completely contact the positive terminal of the battery 2-I, and additionally the pin 4 is depressed by means of the battery 2-I so as to urge the free end of the movable contact plate 5b so that the movable contact plate 5b is separated from the fixed contact plate 5a. Then, the switch 5 generates a signal indicating a condition where a new set of batteries is completely loaded in power supplier. Then, the voltage metering device (not shown) starts its operation. Furthermore, the data stored in a memory circuit such as a RAM of the microcomputer can be read out into an associated CPU.

The basic construction and operation of the power supply according to a preferred embodiment of the present invention is described above. Subsequently, a power supply applied to a camera will be described hereinbelow in detail with reference to FIGS. 2 to 12.

Figure 2:
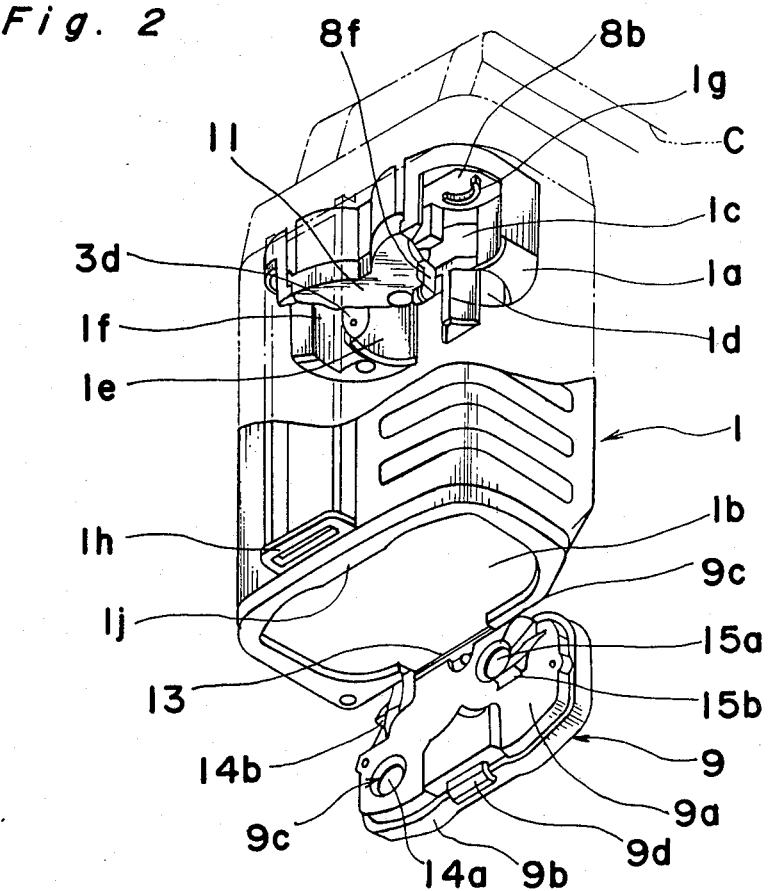
FIG. 2 is a perspective view of a power supply which is applied to a camera.

Referring to FIG. 2, there is shown a power supply assembled into a camera body C. The power supplier has a battery housing 1 which can selectively accommodate any one of a set of cylindrically-shaped batteries including four batteries 2-I, 2-II, 2-III and 2-IV, as shown in FIG. 4 and a single-packed lithium battery or cell 6, as shown in FIG. 5. The lithium battery may comprise a plurality of electrically series-connected dry cells packaged in side-by-side relationship with each other. The lithium battery 6 has a substantially planar side surface 6c, an opposite recessed side surface 6d and a top surface 6e having a positive terminal 6a and a negative terminal 6b. As best shown in FIG. 3, the battery chamber 1b of the housing 1 has substantially the same configuration as that of the lithium battery 6. Accordingly, the lithium battery 6 can be correctly inserted in the chamber 1b. Namely, the housing 1 has, at its inner surface, a projection 1j which fits in the recess 6d of the lithium battery 6.

With continuing reference to FIG. 2, and as shown in FIG. 4, in this embodiment, four AAA-size 1.5 batteries are used. The length L of each battery is longer than the length L' of the 6 lithium battery 6. Accordingly, the housing 1 is provided, at its bottom, with circular sub-chambers 1c, 1d, 1e and 1f which receive, respectively, the corresponding terminals of the batteries 2-I to 2-IV.

As best shown in FIG. 6, the sub-chambers 1c to 1f are so formed on the bottom of the housing 1 as to define a V-shape or C-shape. Accordingly, four batteries 2-I to 2-IV are arranged in the battery chamber 1b in such a manner as shown in FIG. 3 that the center of the terminal of each battery can be offset from the center of terminals 6a and 6b of the lithium cell 6.

Continuing with FIG. 6, a contact plate 7 is located between a pair of inner sub-chambers 1e and 1d, which are close to the hinge 13, and has one end contact portion 7b, which is positioned at the one sub-chamber 1e, and the other end contact portion 7a which is V-shaped and resiliently projects. The contact portion 7b can be in contact with a positive terminal 2b of the battery 2-II, while the other contact portion 7a can be in contact with a negative terminal 2a of the battery 2-III.

Figure 7:
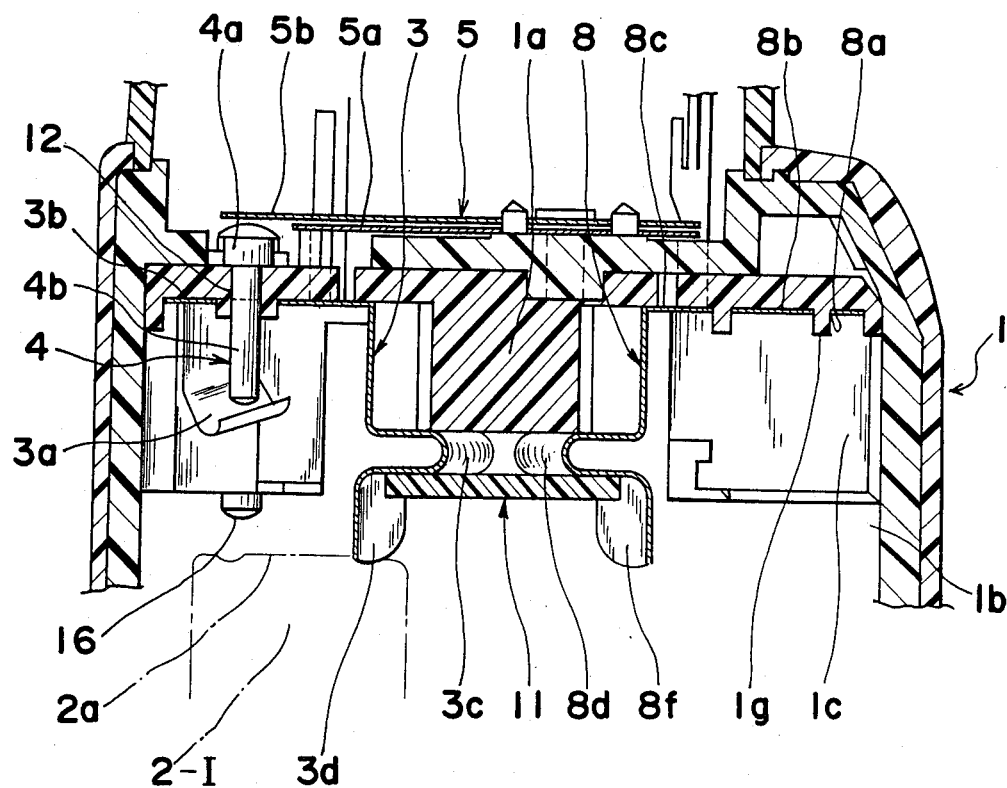
FIG. 7 is a sectional view taken along a line VII—VII in FIG. 6.
Figure 12:
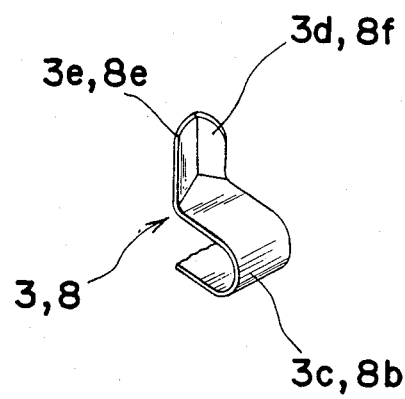
FIG. 12 is a perspective view of a contact plate which is employed in the power supply shown in FIGS. 2. 6 and 7.

An arcuate projection 1g is arranged on the bottom of sub-chamber 1c, which is remote from the hinge 13. The positive terminal 2b of the battery 2-IV, which is inserted in the sub-chamber 1c, is positioned by this projection 1g. If the battery 2-IV is carelessly inserted upside down and the negative terminal of the battery 2-IV is inserted in the sub-chamber 1c, the battery 2-IV can not be completely accommodated in the battery chamber 1b due to the existence of the projection 1g. A contact plate 8 is located on the bottom of the sub-chamber 1c. The contact plate 8 has one main contact portion 8b, which can be in contact with the positive terminal 2b of the battery 2-IV, and a projecting contact portion 8f which is substantially perpendicular to the main contact portion 8b. The projecting contact portion 8f is located at position out of the sub-chamber 1c. The projection 1g projects through an arcuate slit 8a of the main contact portion 8b. As best shown in FIGS. 7 and 12, the projecting contact portion 8f has a U-shaped portion 8b which is sandwiched between the bottom 1a and a fixing plate 11, which is secured on the bottom 1a by means of a set screw S. The projecting contact portion 8f can be in contact with one terminal 6a of the lithium battery 6. When the batteries 2-III and 2-IV rise on the tip of the projecting contact portion 8f, the batteries can easily slide along the round corner 8e of the contact portion 8f to drop into the sub-chamber 1c and 1d.

Returning to FIGS. 6 and 7a contact plate 3 is arranged on the bottom of the sub-chamber 1f. The contact plate 3 has a base portion 3b, which is secured on the bottom, a first C-shaped projecting contact portion 3a, and a second projecting contact portion 3d which is located at a position out of the sub-chamber 1f. The first projecting contact portion 3a can be in contact with the negative terminal 2a of the battery 2-I. The second projecting contact portion 3d is substantially the same as the projecting contact portion 8f of the contact plate 8 and has a U-shaped portion 3c which is sandwiched between the bottom 1a and the fixing plate 11. The tip of the portion 3d can be in contact with a terminal 6b of the lithium battery 6.

Figure 8:
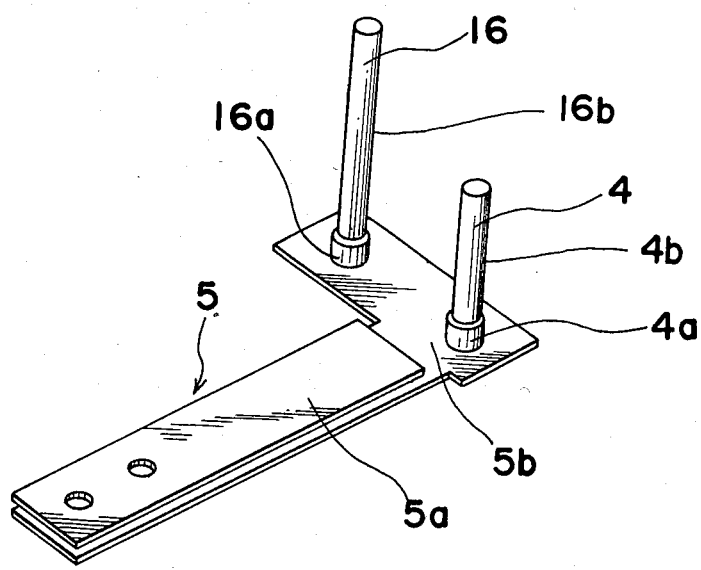
FIG. 8 is a perspective view showing a switch and pins which are respectively employed in the power supply shown in FIGS. 2, 6 and 7.

As best shown in FIG. 7, on the bottom of the sub-chamber 1f is mounted insulation pin 4 which pass through the hole 12 which is formed in the bottom. The pin 4 includes a shaft 4b, a tip of which faces the tip of the contact portion 3a, and a head 4a which is located out of the sub-chamber 1f. The other pin 16, also passing through a holes which is formed in the bottom, is of substnatially the same configuration as that of the pin 4 and has a shaft 16b and head 16a (FIG. 8). The shaft 16b can face the top surface 6e of the lithium battery 6. On the outer surface of the bottom of the battery housing 1 is mounted a switch 5 for detecting whether or not a set of batteries or a single-packed lithium battery is completely inserted in the battery chamber 1b. The switch 5 comprises a fixed contact plate 5a and a movable contact plate 5b which are respectively secured on the bottom of the housing 1. The free end of the movable contact plate 5b faces both heads 4a and 16a of the pins 4 and 16. As shown in FIG. 7, the fixed and movable contact plates 5a and 5b come into contact with each other in the normal condition, i.e. when the batteries or battery are not inserted in the housing 1.

Figure 9:
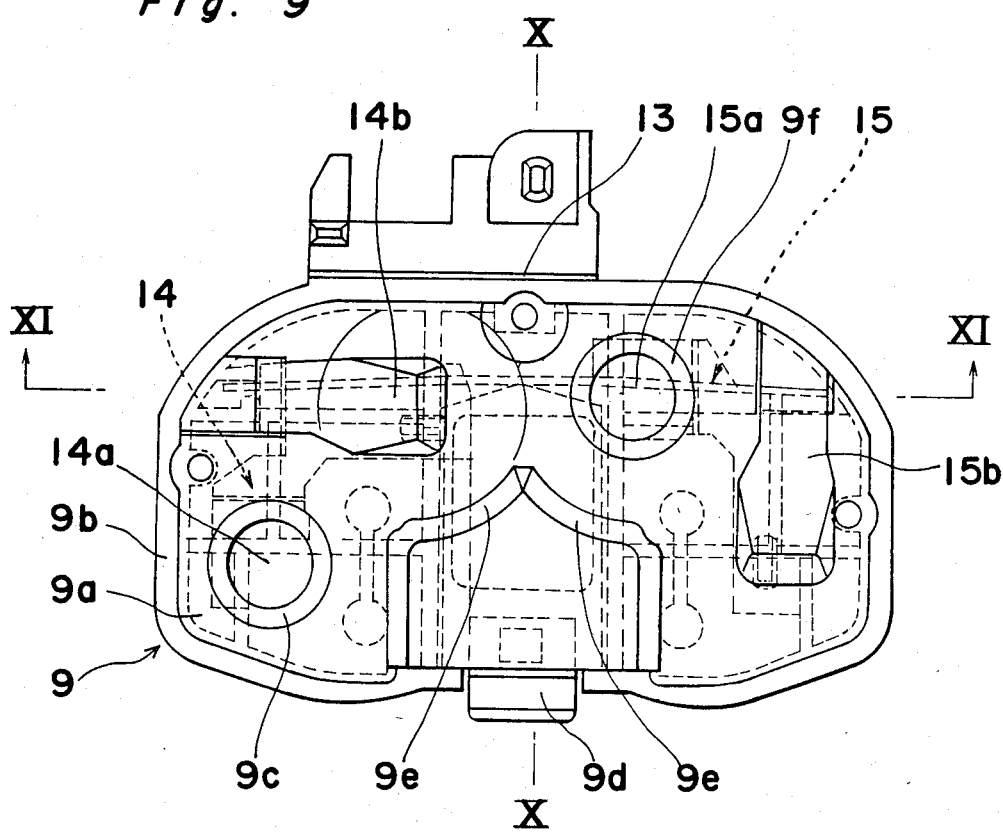
FIG. 9 is a plan view showing an inner surface of a battery door of the power supply shown in FIG. 2.
Figure 11:
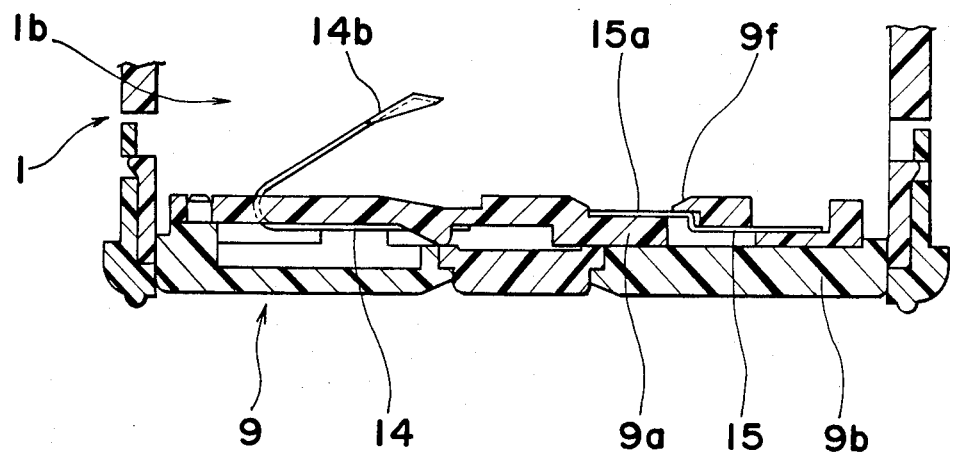
FIGS. 10 and 11 are respectively sectional views taken along lines X—X and XI—XI in FIG. 9.
Figure 10:
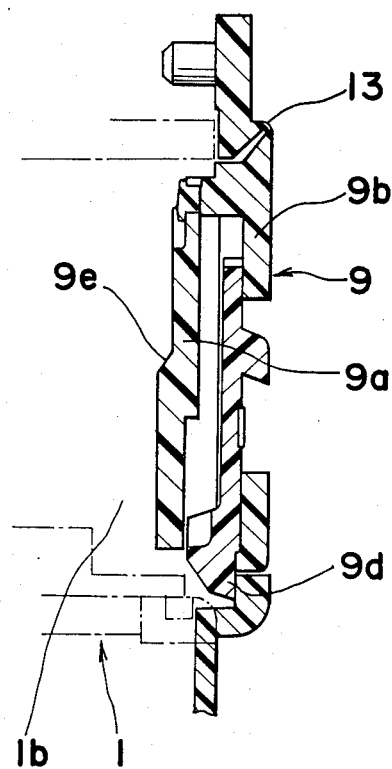

Referring to FIGS. 9, 10 and 11, the battery door 9 includes an outer plate 9b and an inner plate 9a which are secured to each other face-to-face. Between the pair of plates 9a and 9b are arranged a pair of contact plates 14 and 15. The contact plate 14 has a first contact portion 14a, which is located between the inner and outer plates 9a and 9b and appears through an opening 9c formed in the inner plate 14, and a second contact portion 14b which inwardly projects through the inner plate 9a. The first contact portion 14a can be in contact with the positive terminal of the battery 2-I, while the second contact portion 14b can be in contact with the negative terminal of the battery 2-II. The other contact plate 15 has substantially the same configuration as that of the contact plate 14 and has a first contact portion 15a, which is located between the inner and outer portion 9a and 9b and appears through an opening 9f formed in the inner plate 9a, and a second contact portion 15b which inwardly projects through the inner plate 9a. The first contact portion 15a can be in contact with the positive terminal of the battery 2-III, while the second contact portion 15b can be in contact with the negative terminal of the battery 2-IV. The contact portions 14a, 14b, 15a and 15b respectively correspond to the contact portions 3a, 7b, 7a and 8b. Accordingly, when the door 9 is closed after the batteries 2-I to 2-IV have been inserted in the battery chamber 1b, the batteries can be connected to each other in series.

Additionally, the battery door 9 has a hook 9d which can engage with a hook holder 1h which is formed on the edge of the opening of the battery housing 1. The inner plate 9a has a guide wall 9e which can locate the batteries 2-I to 2-IV and lithium battery 6 at the predetermined positions.

With the above construction of the power supply when a set of cylindrical batteries 2-I to 2-IV are employed, a pair of batteries 2-II and 2-III are located at the position close to hinge 13, while the other pair of batteries 2-I and 2-IV are located at the position remote from the hinge 13, as described above. When the battery door 9 is closed after the set of batteries has been inserted in the battery chamber 1b, the pair of inner batteries 2-II and 2-III are first depressed by the door 9, and subsequently the other pair of outer batteries 2-I and 2-IV are depressed by the door 9. It is to be noted that, when the battery 2-I is depressed, the negative terminal of the battery 2-I contacts the contact portion 3a of the contact plate 3. Thus, the pin 4, which faces the contact portion 3a, is depressed, since the contact portion 3a can be resiliently bent, so that the pin 4 pushes the free end of the movable contact plate 5b, and thereby the switch 5 is opened. Then, a signal indicating that a new set of batteries has been completely inserted in the battery chamber 1b is supplied to a voltage metering device (not shown). The voltage metering device starts metering the voltage of the new set of batteries when it receives the information supplied when the switch is opened. If the voltage of the new set of batteries is under the predetermined value, a warning is produced. Furthermore, the data stored in a RAM can be read out to a CPU due to the information indicating the switch 5 is opened. In the case where no data is stored in the RAM, the microcomputer is reset so as to bring the camera into the initial condition.

Moreover, when the single packed lithium battery 6 is employed in the power supply and inserted in the battery chamber 1b and subsequently the battery door 9 is closed, the battery 6 is depressed by the door 9 so that the terminals 6a and 6b come into contact with the corresponding contact portions 8f and 3d and, simultaneously, the pin 16 is depressed by the battery 6, resulting in that the movable contact plate 5b is separated from the fixed contact plate 5a by the pin 16.

According to the above embodiment, the signal indicating that the switch 5 is opened is supplied after the terminals of the pair of outer batteries 2-I and 2-IV, which are located at the position remote from the hinge, have contacted the corresponding contact portions 3a, 14a, 8b and 15b, namely when all of the batteries 2-I to 2-IV have been connected in series. Accordingly, the voltage of the new set of batteries and a single packed lithium battery can be correctly metered. Further, the reading out of the data from the memory circuit into a CPU can be correctly effected. Furthermore, since the contact portions 8f and 3d are located at the corresponding positions out of the corresponding sub-chambers 1c and 1f, the end portions of the cylindrical batteries can be easily inserted in the corresponding sub-chambers 1c and 1f. Even if the end portions of the batteries come into contact with the contact portions 8f and 3d, since the tip corners of the contact portions 8f and 3d are rounded, the end portions of the batteries can easily slide along the rounded corners of the contact portions 8f and 3d to drop into the corresponding sub-chambers 1c and 1f. Furthermore, according to the above embodiment, the battery housing 1 has a main battery chamber 1b for accommodating most parts of different types of batteries, and several sub-chambers which are located on the bottom of the housing and designed to accommodate the end portions of the cylindrical batteries. Accordingly, the construction is very simple and can accommodate different types of batteries, i.e. cylindrical batteries and a lithium battery.

Although the present invention has been fully described by way of example with reference to the accompanying drawings, it is to be noted here that various changes and modifications will be apparent to those skilled in the art. For instance, the number of the cylindrical batteries to be employed in the power supply according to the present invention is not limited to four as shown in the above embodiment. The present invention can be applied to a power supply such that a plurality of batteries are located at two positions, i.e. a position close to a hinge, which connects the battery door to the battery housing, and the other position remote from the hinge. Batteries other than AAA-size batteries can also be employed. A lever can be employed instead of the insulation pins. The lever may be designed so as to rock according to the axial movement of the corresponding battery so that the switch is operated. A resilient plate can also be employed instead of the insulation pins. The resilient strap may be designed so as to be flexed according to the axial movement of the corresponding battery so that the switch is operated. Therefore, unless otherwise such changes and modifications depart from the scope of the present invention, they should be construed as included therein.

What is claimed is:

1. A power supply for use in an electronic apparatus comprising:
   a battery housing for accommodating a set of cylindrically-shaped batteries in parallel-spaced relationship with each other,
   a battery door connected to the battery housing by a hinge to expose an opening of the housing and to close the opening to axially depress the batteries, and some of said batteries being located in the battery housing at one position relatively close to the hinge and the remainder of the batteries being located at another position relatively remote from the hinge;
   a first contact means mounted on a bottom of the battery housing to be in contact with terminals of the batteries,
   a second contact means mounted on the battery door to be in contact with terminals of the batteries and to connect the batteries in series in association with the first contact means,
   a detector mounted on the bottom of the battery housing to operate when at least one battery located at the position remote from the hinge is depressed due to the battery door closing operation and the batteries are connected to each other in series, and
   a switch mounted on the bottom of the battery housing to operate due to the operation of the detector for signalling said apparatus that the batteries have been connected to each other in series.

2. A power supply as claimed in claim 1, wherein the battery housing has a battery chamber to selectively accommodate a set of cylindrically-shaped batteries, and a single specific battery which has substantially the same configuration as that of the battery chamber and has, on its same plane, a positive terminal and a negative terminal, the length of the specific battery being shorter than that of each cylindrically-shaped battery,
   the battery chamber further has a main chamber or accommodating most parts of the cylindrically-shaped batteries and the entire specific battery, and sub-chambers which are defined on the bottom of the battery housing to accommodate one end portion of each cylindrically-shaped battery, and
   the first contact means comprises a first group of contact means arranged on a bottom of the sub-chambers so as to contact terminals of the cylindrically-shaped batteries, and a second group of contact means which is arranged to project into the main chamber from the bottom of the main chamber to contact the terminals of the specific battery.

3. A power supply as claimed in claim 2, wherein the single specific battery comprises a plurality of electrically series-connected dry cells packaged in side-by-side relationship with each other.

* * * * *